(12) United States Patent
Guillet et al.

(10) Patent No.: US 9,694,902 B2
(45) Date of Patent: Jul. 4, 2017

(54) DEVICE FOR MAKING AVAILABLE NAVIGATION PARAMETER VALUES OF A VEHICLE

(71) Applicant: Airbus Operations S.A.S., Toulouse (FR)

(72) Inventors: Alain Guillet, Blagnac (FR); Gilles Tatham, Pibrac (FR); Patrice Brot, Ramonville Saint-Agne (FR); Marc Fervel, Toulouse (FR); Philippe Goupil, Beaupuy (FR)

(73) Assignee: Airbus Operations S.A.S., Toulouse (FR)

( * ) Notice: Subject to any disclaimer, the term of this patent is extended or adjusted under 35 U.S.C. 154(b) by 0 days.

(21) Appl. No.: 14/134,308

(22) Filed: Dec. 19, 2013

(65) Prior Publication Data

US 2014/0236395 A1    Aug. 21, 2014

(30) Foreign Application Priority Data

Dec. 21, 2012    (FR) ...................................... 12 62659

(51) Int. Cl.
| | |
|---|---|
| *B64C 13/00* | (2006.01) |
| *G01C 21/20* | (2006.01) |
| *G05D 1/00* | (2006.01) |
| *G05B 9/03* | (2006.01) |
| *G08G 5/00* | (2006.01) |

(52) U.S. Cl.
CPC .............. *B64C 13/00* (2013.01); *G01C 21/20* (2013.01); *G05B 9/03* (2013.01); *G05D 1/0077* (2013.01); *G08G 5/0021* (2013.01); *G08G 5/0056* (2013.01)

(58) Field of Classification Search
CPC .......... B64C 13/00; G01C 21/20; G05B 9/03; G05D 1/0077; G08G 5/0021; G08G 5/0056
USPC ......................................................... 701/3, 4
See application file for complete search history.

(56) References Cited

U.S. PATENT DOCUMENTS

| | | | | |
|---|---|---|---|---|
| 4,106,094 A | * | 8/1978 | Land .............................. | 701/504 |
| 5,274,554 A | * | 12/1993 | Takats ................. | G06F 11/1641 |
| | | | | 244/76 R |

(Continued)

OTHER PUBLICATIONS

French Searching Authority, French Search Report for 1262659 Mailed Aug. 22, 2013.

(Continued)

*Primary Examiner* — Fadey Jabr
*Assistant Examiner* — Angelina Shudy
(74) *Attorney, Agent, or Firm* — Lorenz & Kopf, LLP

(57) ABSTRACT

A device for making available navigation parameter values of a vehicle is provided. The device includes components distributed in the following categories: several sensors collecting measurement data relating to at least one navigation parameter of the vehicle; several computers processing the measurement data collected by the sensors and calculating said navigation parameters; several networks linking the sensors to the computers and linking the computers to systems using said parameters. The networks transmit all the collected measurement data to the computers, which calculate a value for each navigation parameter as well as an estimated value of the associated fault, using a single common fusion algorithm.

18 Claims, 2 Drawing Sheets

(56) References Cited

U.S. PATENT DOCUMENTS

| | | | | |
|---|---|---|---|---|
| 5,839,093 A * | 11/1998 | Novosel | G01R 31/086 | 324/525 |
| 6,856,905 B2 * | 2/2005 | Pasturel et al. | | 701/476 |
| 8,264,376 B1 * | 9/2012 | McLoughlin | G01C 23/00 | 340/945 |
| 8,280,562 B2 * | 10/2012 | Villaume et al. | | 701/3 |
| 8,344,850 B2 * | 1/2013 | Girard, III | H04L 63/102 | 307/10.2 |
| 8,538,602 B2 * | 9/2013 | Brot | G05D 1/0077 | 244/221 |
| 8,718,931 B2 * | 5/2014 | Belcher | G01C 21/165 | 244/194 |
| 8,897,957 B2 * | 11/2014 | Stoehr | B60C 23/009 | 701/36 |
| 9,195,232 B1 * | 11/2015 | Egnor | B60W 30/00 | |
| 9,404,775 B2 * | 8/2016 | Mylaraswamy | G01D 18/00 | |
| 2003/0195673 A1 * | 10/2003 | Foch | G05B 9/03 | 701/3 |
| 2004/0002776 A1 * | 1/2004 | Bickford | G05B 23/0254 | 700/30 |
| 2005/0114743 A1 * | 5/2005 | Moorhouse | | 714/100 |
| 2006/0009958 A1 * | 1/2006 | Orth | G05B 9/03 | 703/13 |
| 2006/0248409 A1 * | 11/2006 | Baumann et al. | | 714/47 |
| 2007/0038911 A1 * | 2/2007 | Koenemann | G01R 31/31703 | 714/732 |
| 2007/0135975 A1 * | 6/2007 | Stange | B64C 13/503 | 701/3 |
| 2008/0126882 A1 * | 5/2008 | Fulton | G05B 19/058 | 714/48 |
| 2008/0208399 A1 * | 8/2008 | Pham | G01C 23/00 | 701/4 |
| 2009/0083368 A1 * | 3/2009 | Stayton et al. | | 709/202 |
| 2009/0150009 A1 * | 6/2009 | Villaume et al. | | 701/3 |
| 2010/0170983 A1 * | 7/2010 | Fervel | B64C 13/40 | 244/99.2 |
| 2010/0204853 A1 * | 8/2010 | Sghairi | G05D 1/0077 | 701/4 |
| 2010/0211258 A1 * | 8/2010 | Sakurai | B60W 50/0205 | 701/29.1 |
| 2010/0222943 A1 * | 9/2010 | Sghairi | B64C 13/503 | 701/4 |
| 2011/0103268 A1 * | 5/2011 | Mann | H04L 12/40169 | 370/276 |
| 2011/0251739 A1 * | 10/2011 | Tomas | B64C 13/503 | 701/3 |
| 2011/0276199 A1 * | 11/2011 | Brot | G05D 1/0077 | 701/3 |
| 2012/0101663 A1 | 4/2012 | Fervel et al. | | |
| 2012/0290153 A1 * | 11/2012 | Olsoe | B64C 13/42 | 701/3 |
| 2013/0076540 A1 * | 3/2013 | McLoughlin | B64D 45/00 | 340/945 |
| 2014/0100816 A1 * | 4/2014 | Rogoff | G01D 3/08 | 702/176 |
| 2014/0180504 A1 * | 6/2014 | Fervel | H04L 12/6418 | 701/3 |
| 2014/0228981 A1 * | 8/2014 | Wang | G05D 1/0066 | 700/32 |
| 2014/0372078 A1 * | 12/2014 | Gheorghe | G01M 17/00 | 702/183 |
| 2015/0088341 A1 * | 3/2015 | De Rammelaere et al. | | 701/3 |
| 2015/0233730 A1 * | 8/2015 | Guillet | B64D 43/02 | 701/3 |
| 2015/0253150 A1 * | 9/2015 | Guillet | G01C 23/005 | 701/480 |
| 2015/0338850 A1 * | 11/2015 | Connor | B64C 19/00 | 701/30.3 |
| 2015/0362598 A1 * | 12/2015 | Rollet | G01S 19/15 | 701/17 |

OTHER PUBLICATIONS

Christmansson, J. et al., "Dependable Flight Control System by Data Diversity and Self-Checking Components," Microprocessing and Microprogramming, Elsevier Science Publishers, Bv., Amsterdam, NL, vol. 40, No. 2-3, pp. 207-222 (Apr. 1, 1994).

Sklaroff, J. R., "Redundancy Management Technique for Space Shuttle Computers," IBM Journal of Research and Development, International Business Machines Corporation, New York, NY, vo. 20, No. 1, pp. 20-28 (Jan. 1, 1976).

Wikipedia, "Redundancy (engineeing)", http://en.wikipedia.org/w/index,php?title_Redundancy_(engineering)&oldid=514367615 (Sep. 24, 2012).

* cited by examiner

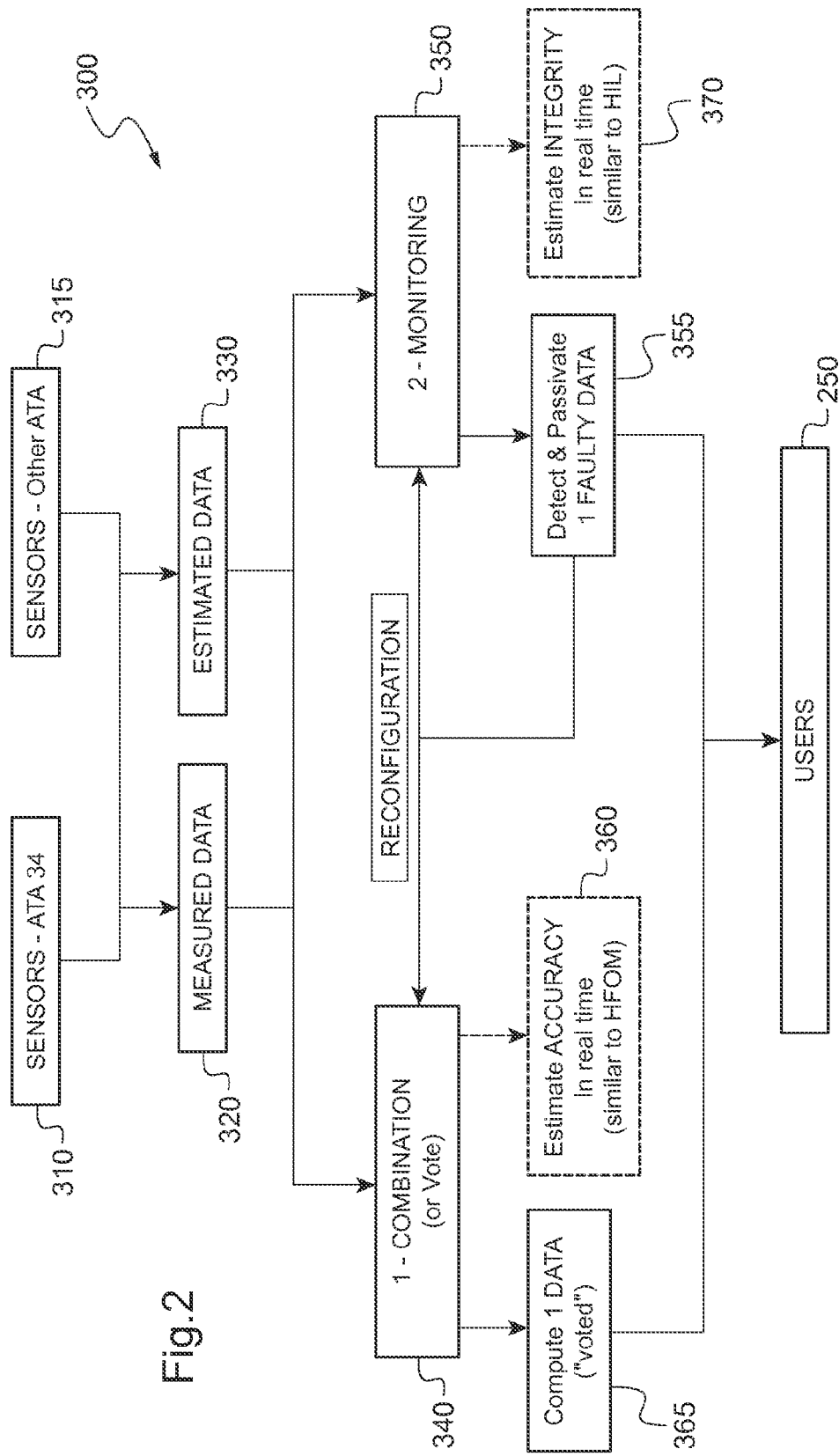

DEVICE FOR MAKING AVAILABLE NAVIGATION PARAMETER VALUES OF A VEHICLE

CROSS-REFERENCE TO RELATED APPLICATION

This application claims priority to French Patent Application No. 12 62659, filed Dec. 21, 2012, which is incorporated herein by reference in its entirety.

TECHNICAL FIELD

The technical field relates to a device for making available the navigation parameter values of a vehicle, in particular to the architecture thereof.

BACKGROUND

On board a vehicle, many systems use navigation parameters (position, speed, data relating to the environment, etc.). These parameters must have sufficient accuracy and integrity in order to be made available to user or pilot systems.

By accuracy it is meant the difference with respect to the true (theoretical) value of a parameter that it is sought to measure. Accuracy can be more easily defined in terms of an absolute fault or percentage. By integrity it is meant the ability to provide correct parameter values with respect to reality, even in the event of a failure.

In this connection, a distinction is drawn between failures known as "simple" failures, i.e. failures occurring on a particular piece of equipment, and failures known as "generic" or "common-mode" failures, affecting all hardware or software of the same type or having a similar technology.

These common-mode failures can for example originate from equipment or program design faults, extreme environmental conditions (high temperatures, vibrations, etc.), or also faults linked to the installation, maintenance or degradation of a piece of equipment.

At present, the system and functional architectures are based on the following components and algorithms: sensors, making it possible to collect measurement data relating to navigation parameters of a vehicle; computers containing algorithms known as fusion algorithms, making it possible to process redundant measurement data sent by the sensors, these computers being accommodated both in certain sensors and in the systems using the parameter values thus collected; and links or networks, making it possible to link the sensors to the user systems containing the fusion algorithms.

The design of the aircraft of the future must meet two major challenges: on the one hand reducing the aircraft's environmental footprint and on the other hand the presence of more automation on board the aircraft in order to reduce the pilot's workload (for example: extension of the scope of the Autopilot).

In order to meet the first objective, reducing the weight of the device is essential. In this context, it can be useful to reduce the number of pieces of equipment on board, the number of cables, and to optimize communication between the different systems. In order to meet the second objective, it is necessary to extend the availability of the flight parameters compared with the state of the art.

In this context, a drawback of the state of the art lies in the fact that several fusion algorithms of the navigation parameters are contained in different systems which have to be supplied with the different navigation parameter measurements.

Given that the existing devices use several fusion algorithms contained in computers accommodated both in the sensors and the user systems, each algorithm has specific features (inputs, comparison thresholds, confirmation times, etc). Their performances are therefore necessarily heterogeneous.

Furthermore, when a modification is necessary in order to obtain a given parameter, it has to be duplicated in each of the sensors or user systems, leading to significant costs in terms of time and resources.

In addition, other objects, desirable features and characteristics will become apparent from the subsequent summary and detailed description, and the appended claims, taken in conjunction with the accompanying drawings and this background.

SUMMARY

According to various embodiments, the present disclosure proposes to remedy at least one of these drawbacks by improving the structure of a device for making available the navigation parameter values of a vehicle.

To this end, the present disclosure relates to a device for making centrally available navigation parameter values of a vehicle, comprising components distributed into the following categories: several sensors collecting measurement data relating to at least one navigation parameter of the vehicle; several computers processing the measurement data collected by the sensors and calculating said navigation parameters; several networks linking the sensors to the computers and linking the computers to systems using said parameters.

The device according to various embodiments is characterized by the fact that the networks transmit all the collected measurement data to the computers, and the computers calculate and make available, for use by the user systems, a value for each navigation parameter as well as an estimated value of the fault associated with said parameter, using the transmitted measurement data and a single fusion algorithm contained in each of said several computers.

By obtaining a quantified estimate of the faults, each system using navigation parameters receives, for each parameter, an item of data relating to the quality of the parameter performances.

The user systems are therefore able to manage a situation resulting from degradation of the performances of a parameter. They can in particular decide to use or not to use a given parameter depending on their need for performance with respect to this parameter.

Thus, in the case of a temporary degradation of a parameter, the parameter can continue to be calculated and transmitted.

In fact, by means of the associated quantified estimate of the fault, the quality of its performance can be evaluated and monitored by the user system in real time. Any fault occurring with respect to a parameter does not therefore necessarily lead to its rejection and the loss of function of the corresponding operation.

Another advantage of the device according to the present disclosure lies in the fact that it uses only a single fusion algorithm.

Besides the homogeneity of the data presented on board the vehicle in the event of failure, all the systems using navigation parameters have direct access to the navigation parameter values as transmitted by the computers containing the single fusion algorithm, rather than to values having passed through an intermediate algorithm.

Moreover, as the single fusion algorithm has and receives all of the possible data available in the aircraft, it has means for making the best possible fusion of the measurement data.

Finally, when a modification of the calculation to be carried out in order to obtain a navigation parameter value is necessary, this modification is to be made in one go, greatly reducing the costs of the modification in terms of time and resources.

In one embodiment, each component of each category is associated with a twin component performing the same function having a different operating mode, so that a common-mode failure affecting one of the two twin components does not lead to a failure on the other.

The distinction between failures known as "simple" failures, i.e. failures occurring on a particular piece of equipment, and those known as "generic" or "common-mode" failures, affecting all hardware or software of the same type or having a similar technology is recalled here.

The device proposed by various embodiments makes available the navigation parameters values of the vehicle with a better level of availability.

In fact, as there is a material dissimilarity between its components, particularly the sensors, the computers and the networks, a loss of function of the components of the same type does not affect the components of dissimilar type, which makes it possible to keep the function available.

According to one embodiment, in order to increase the availability of the navigation parameters, the device also comprises estimators making it possible to estimate navigation parameter values from other parameters of the vehicle.

The advantage of the use of estimators comprises the ability to verify the measurement data originating from the sensors using relations linking together the navigation parameters (for example flight mechanics equations). It makes it possible to confer redundancy upon the device, or also to obtain estimates of parameter values that cannot be measured directly by sensors.

The estimators can in particular include side-slip estimators, speed estimators and coherence estimators.

By coherence estimator is meant here the estimators making it possible to monitor several measurements and/or estimators linked by theoretical equations, or affected by the same common cause.

However, the present disclosure is of course not limited to these types of estimators; others can also be used.

According to one embodiment, the fusion algorithm comprises a combination function configured in order to provide a single navigation parameter value from several items of measurement data.

This also makes it possible to provide an estimated value of the fault of the parameter in the absence of failure. This parameter is sometimes called $PL_{FF}$ (Protection Level Fault Free) or level of protection in the absence of failure, or also FOM (Figure of Merit), or performance level.

According to one embodiment, the fusion algorithm comprises a monitoring function configured in order to detect a possible measurement fault in the measurement data and to deactivate or exclude an associated item of measurement data.

This also makes it possible to provide an estimated value of the fault of the parameter in the presence of a failure. This parameter is sometimes called $PL_{FD}$ (Protection Level Fault Detected), level of protection in the event of failure, or IT (Integrity Limit). In order to cover a maximum number of circumstances that can arise during the movement of the vehicle, the estimated value of the measurement fault associated with each navigation parameter is made available in the absence of failure and/or in the presence of a failure.

In one exemplary embodiment, in order to increase the availability of the navigation parameters, as well as to maintain the operation of the device in the event of failure of the computers containing the single fusion algorithm, these computers are of dissimilar technology.

These computers are for example of the integrated modular avionics or IMA type on the one hand and of the line replaceable unit or LRU type on the other hand. In one example, the single fusion algorithm is duplicated, on the one hand, in two computers of the IMA type and, on the other hand, in two computers of the LRU type.

According to one embodiment, the networks are of dissimilar technology, for example of the AFDX ("Avionics Full DupleX switched ethernet") type on the one hand, and of the ARINC 429 or Erebus type on the other hand.

Networks of the Erebus type are known in particular from the document FR2952261 A1, incorporated herein by reference.

Dissimilar networks are known in particular from the document FR2943036 A1, incorporated herein by reference.

For each type of network, the number of networks considered is variable and can typically range from one to two.

According to one embodiment, the vehicle the navigation parameter values of which are made available is an aircraft.

For each type of network, the number of sensors considered is variable and can typically range from one to four, but any other number can also be envisaged.

According to one embodiment, the user systems are capable of deciding to use or not to use a given parameter as a function of the estimated value of the fault associated with said navigation parameter.

The various teachings of the present disclosure finally relates to an aircraft comprising a device for making available navigation parameter values according to the present disclosure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 2 is a schematic representation of the operation of a fusion algorithm according to an embodiment of the present disclosure.

DETAILED DESCRIPTION

Figure 1:
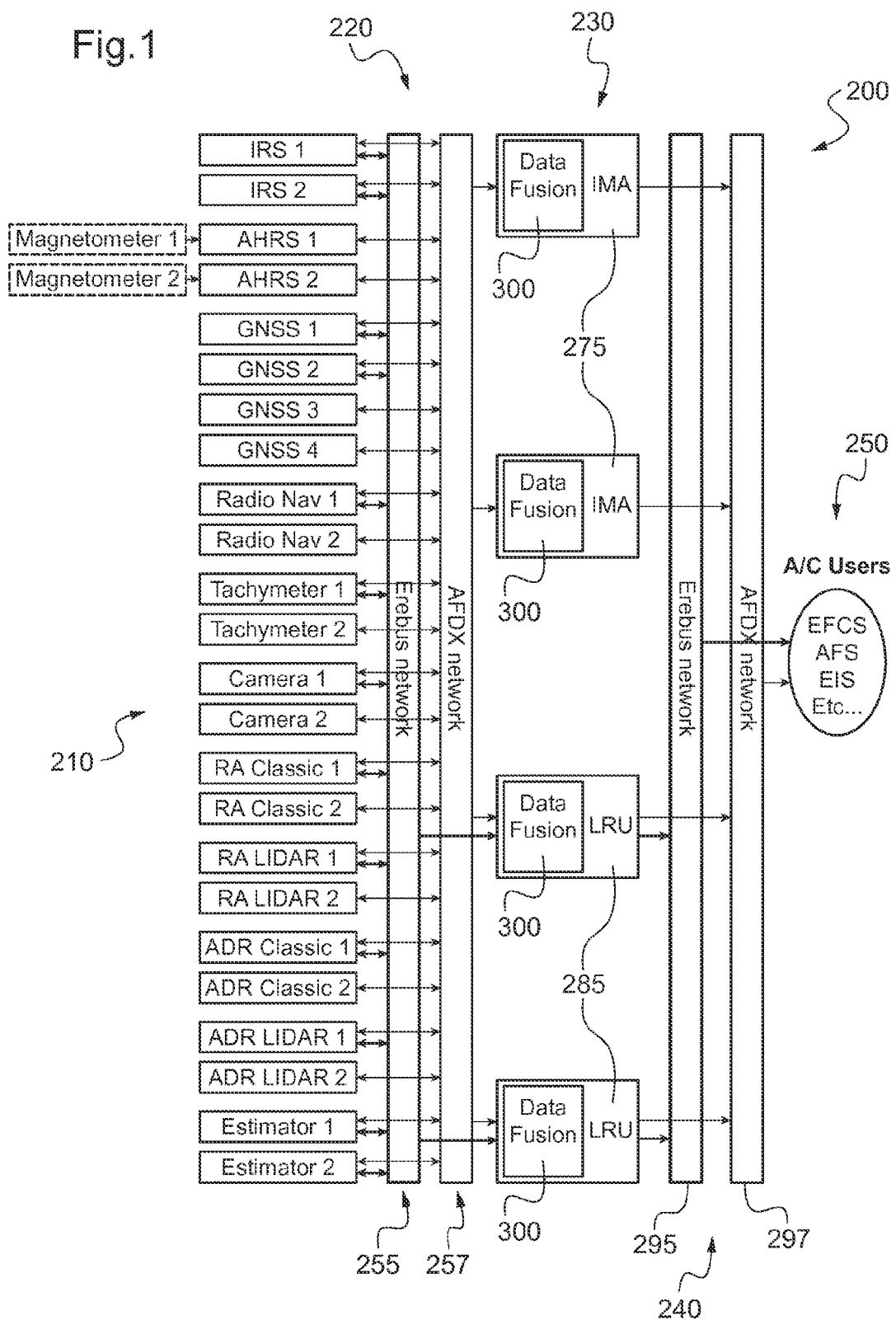
FIG. 1 is a schematic representation of the architecture of a device for making available navigation parameter values of a vehicle according to an embodiment of the present disclosure.

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows schematically the architecture of a device 200 for making available navigation parameters of a vehicle (in the case in point of an aircraft), according to an embodiment of the present disclosure. The device 200 comprises a set of sensors 210, a measurement data (raw data originating from the sensors) transmission network 220, a set of computers 230, a transmission network for processed data 240, i.e. for fused data or data, and a set of systems 250 using the aircraft navigation parameters.

The sensors 210 comprise in one example, sensors of the following types: altitude and navigation controls or AHRS ("Altitude and Heading Reference System"); of the central inertial or IRS (Inertial Reference System) type, measuring the following navigation parameters: position (horizontal and vertical), ground speed (horizontal and vertical), path angle (horizontal and vertical), attitude angles (roll, pitch), heading angle, linear acceleration (in all 3 axial directions), speed of rotation (in all 3 axial directions); of the satellite positioning system or GNSS (Global Navigation Satellite System), GPS or Galileo type measuring for example the following navigation parameters: position (horizontal and vertical), speed (horizontal and vertical), path angle (horizontal and vertical); of the standard "ADR" (Air Data Reference) and/or laser teledetection or LIDAR (Light Detection and Ranging") type, based on pressure, incidence, skidding and temperature probes and measuring the following navigation parameters: air speed (calculated, indicated and true), altitude, vertical speed, temperature (total and static), angle of attack, side-slip angle; of the standard "RA" radio altimeter and/or LIDAR type, based on the time of reflection of a radio wave on the ground and measuring the parameters of heights above the ground; of the radio navigation or "Radio Nav" type, based on ground markers and providing data on distance or bearing and measuring the horizontal position parameters; of the landing aid instrument or ILS/MLS ("Instrument Landing System" and "Microwave Landing System") type, based on ground markers and providing deviations with respect to the landing runway centreline and measuring the parameters of deviation with respect to a reference axis; of the "GLS" ("Global Landing System") type, based on the GNSS system, providing deviations with respect to the landing runway centreline and measuring the parameters of deviation with respect to a reference axis; tachymeters; cameras; and estimators of navigation parameters.

As can be seen in FIG. 1, two sensors having different operating modes, either at the level of their structure, their components or the technology used, are associated with the search for measurement data relating to a particular navigation parameter.

The measurement data collected by the sensors 210 is transmitted to the computers 230 via the measurement data transmission network 220.

Such a network is constituted by at least two sub-networks, namely on the one hand a first measurement data transmission sub-network 255, and on the other hand a second measurement data transmission sub-network 257.

It is of course possible to envisage a greater number of measurement data transmission sub-networks.

In any case, the measurement data transmission sub-networks have different operating modes, either at the level of their structure, their components or the technology used.

Thus, in the exemplary embodiment as presented, the first measurement data transmission sub-network 255 is for example a network benefiting from the Erebus-type technology. As for the second measurement data transmission sub-network 257, it is for example a redundant network of the avionics ethernet type or AFDX ("Avionics Full DupleX switched ethernet").

This technological disparity between the measurement data transmission sub-networks means that a generic failure cannot affect the entire measurement data transmission network 220.

The data originating from the measurement data transmission network 220 is then transmitted to at least one computer 230.

In the exemplary embodiment associated with FIG. 1, for redundancy purposes, they are four in number, and distributed in two groups of two.

Thus, a first group of computers 275 comprises two computers 230 of the IMA ("Integrated Modular Avionics") type and a second group of computers 285 comprises two computers 230 of the LRU ("Line Replaceable Unit") type.

Each of these computers 230 contains one and the same fusion algorithm 300, which is therefore duplicated four times in all.

As for the measurement data transmission networks, it is also possible to provide only two computers 230, or more than four computers 230, provided however that there are at least two having a different technology in order to prevent a generic failure affecting all of the computers 230.

FIG. 2 shows the main functions of the fusion algorithm 300 contained in the computers 230.

The measurement data originating from sensors 310 corresponding to the standard ATA 34, and originating from sensors 315 corresponding to other ATA standards are first collected and distributed into two types: the measured data 320 and the estimated data 330.

In the case of the estimated data 330, these involve combining certain of the measured data 320 and obtaining estimated values 330 using relations governing the sought navigation parameters.

By way of example, estimators of the side-slip estimator, speed estimator and coherence estimator type can be implemented.

The fusion algorithm 300 then implements two distinct functions in parallel: a combination function 340 and a monitoring function 350.

The combination function 340 combines and processes the measured data 320 and estimated data 330 in order to provide a single value corresponding to the desired navigation parameter.

As for the monitoring function 350, it detects any measurement fault among the measured data 320.

In the case of such a detection, a passivation function 355 makes it possible to deactivate (exclude) a measurement value called into question and transmits a piece of passivation data both to the combination function 340 and to the monitoring function 350.

Based on this data, the monitoring function 350 provides, using a sub-function for estimating the integrity 370, an estimated value of the fault for each parameter value thus excluded due to a failure, either simple or common-mode. This estimated fault value is for example a number or a percentage reflecting the probability or the extent of a parameter fault.

Such a parameter is therefore called $PL_{FD}$ (Protection Level Fault Detected).

For its part, based on the passivation data, the combination function 340 proceeds to a vote 365 which elects the navigation parameter values to be transmitted and transmits them to the user 250 via the processed data transmission network 240.

The combination function 340 can use voting algorithms of the double vote type, average or median type between two, three or four measurements, of fixed weighting vote type, or variable weighting vote type.

In parallel with the vote 365, the combination function 340 provides, using a sub-function for estimation of the accuracy 360, an estimation of the fault for each parameter thus provided.

Such a parameter is therefore called $PL_{FF}$ (Protection Level Fault Free).

The estimated parameter fault values $PL_{FD}$ and/or $PL_{FF}$, as well as the navigation parameter values originating from processing of the data received by the sensors are transmitted to the user systems 250 via the processed data transmission network 240.

As for the measurement data transmission network, the processed data transmission network 240 is divided into two sub-networks, a first processed data transmission sub-network 295 and a second processed data transmission sub-network 297.

They will have for example an Erebus type technology and an AFDX type technology respectively.

As designed, the device has the advantage of carrying out a centralization of the fusion algorithm, in other words using only a single fusion algorithm for the whole vehicle.

The user systems 250 can also, by obtaining estimated parameter fault values, manage any degradation of the performances of a parameter, due for example to a temporary failure.

In fact, the value or level of these estimates can allow the user systems 250 to decide to use or not to use a given parameter value as a function of the particular parameter performance needs, rather than to systematically reject the value of the parameter as soon as an fault is detected.

Apart from the advantages linked to the centralization of the algorithm 300, the device for making available navigation parameter values 200 withstands a loss of functionality of one technology, by means of the technological disparities between the components of the device for making available navigation parameter values 200.

The examples described above are merely possible, non-limitative embodiments of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A device for making centrally available, navigation parameter values of a vehicle, comprising a plurality of components distributed in the following categories:

a plurality of sensors that collect measurement data relating to at least one navigation parameter of the vehicle, wherein the plurality of sensors includes a first sensor configured to sense a selected navigation parameter using a first sensor operation mode and a second sensor configured to sense the selected navigation parameter using a second sensor operation mode different from the first sensor operation mode such that a common mode failure affecting the first sensor will not affect the second sensor;

a plurality of computers that process the measurement data collected by the plurality of sensors and calculate said at least one navigation parameter of the vehicle, wherein the plurality of computers includes a first computer configured to process the measurement data collected by the first sensor and the second sensor and calculate the selected navigation parameter using a first computer operation mode and a second computer configured to process the measurement data collected by the first sensor and the second sensor and calculate the selected navigation parameter using a second computer operation mode different from the first computer operation mode such that a common mode failure affecting the first computer will not affect the second computer;

a plurality of networks that link the sensors to the plurality of computers and link the plurality of computers to a plurality of user systems using said at least one navigation parameter of the vehicle, wherein the plurality of networks includes a first network that links the first and second sensors to the first and second computers using a first network operation mode and a second network that links the first and second sensors to the first and second computers using a second network operation mode different from the first network operation mode such that a common mode failure affecting the first network will not affect the second network; wherein:

the plurality of networks transmit all the collected measurement data to the plurality of computers, and the plurality of computers calculate and make available, for use by the plurality of user systems, the value for each of the at least one navigation parameter of the vehicle as well as an estimated value of a fault associated with said at least one navigation parameter of the vehicle, using the transmitted measurement data and a single fusion algorithm contained in each of said plurality of computers.

2. The device according to claim 1, wherein the single fusion algorithm comprises a combination function configured to provide a single value of the navigation parameter values from several pieces of measurement data.

3. The device according to claim 1, wherein the single fusion algorithm comprises a monitoring function configured to detect any measurement fault in the measurement data and to deactivate or exclude an associated piece of measurement data.

4. The device according to claim 1, wherein an estimated value of the fault associated with each value of the navigation parameter values is made available in at least one of an absence of a simple failure or the common mode failure and in a presence of a simple failure or the common mode failure.

5. The device according to claim 4, wherein the estimated value of the fault in the presence of the failure takes into account both the simple failure and the common mode failure.

6. The device according to claim 1, wherein the plurality of computers are of dissimilar technology types.

7. The device according to claim 6, wherein the plurality of computers include at least one integrated modular avionics computer and at least one line replaceable unit computer.

8. The device according to claim 1, further comprising a plurality of estimators that estimate navigation parameter values from other parameters of the vehicle.

9. The device according to claim 8, wherein the plurality of estimators comprise side-slip estimators, speed estimators and coherence estimators.

10. The device according to claim 1, wherein the plurality of networks are of dissimilar technology types.

11. The device according to claim 10, wherein the plurality of networks comprise at least one Avionics Full DupleX switched ethernet network and at least one Erebus network.

12. The device according to claim 1, wherein the vehicle is an aircraft.

13. The device according to claim 1, wherein the plurality of user systems decide to use or not to use the value for each of the navigation parameter values as a function of the estimated value of the fault associated with each of the navigation parameter values.

14. An aircraft, comprising:
a device for making available navigation parameter values comprising a plurality of components distributed in the following categories:
a plurality of sensors that collect measurement data relating to at least one navigation parameter of the vehicle, wherein the plurality of sensors includes a first sensor that collects measurement data relating to a selected navigation parameter of the vehicle using a first sensor operation mode and a second sensor that collects measurement data relating to the selected navigation parameter of the vehicle using a second sensor operation mode different from the first sensor operation mode such that a common mode failure affecting the first sensor will not affect the second sensor;
a plurality of computers that process the measurement data collected by the plurality of sensors and calculate said navigation parameter values of the vehicle, wherein the plurality of computers includes a first computer that processes the measurement data collected by the plurality of sensors and calculate said navigation parameter values of the vehicle using a first computer operation mode and a second computer that processes the measurement data collected by the plurality of sensors and calculate said navigation parameter values of the vehicle using a second computer operation mode different from the first computer operation mode such that a common mode failure affecting the first computer will not affect the second computer;
a plurality of networks that link the sensors to the plurality of computers and link the plurality of computers to a plurality of user systems using said navigation parameter values, wherein the plurality of networks includes a first network that links the first and second sensors to the first and second computers using a first network operation mode and a second network that links the first and second sensors to the first and second computers using a second network operation mode different from the first network operation mode such that a common mode failure affecting the first network will not affect the second network; wherein:
the plurality of networks transmit all the collected measurement data to the plurality of computers and at least two of the plurality of networks are of dissimilar technology types, and
the plurality of computers calculate and make available, for use by the plurality of user systems, the value for each of the navigation parameter values as well as an estimated value of a fault associated with said navigation parameter values, using the transmitted measurement data and a single fusion algorithm contained in each of said plurality of computers.

15. The aircraft according to claim 14, wherein the single fusion algorithm comprises a combination function configured to provide a single value of the navigation parameter values from several pieces of measurement data.

16. The aircraft according to claim 14, wherein the single fusion algorithm comprises a monitoring function configured to detect any measurement fault in the measurement data and to deactivate or exclude an associated piece of measurement data.

17. The aircraft according to claim 14, wherein the estimated value of the fault associated with each value of the navigation parameter values is made available in at least one of a simple failure or the common mode failure and in a presence of a simple failure or the common mode failure.

18. The aircraft according to claim 17, wherein the estimated value of the fault in the presence of the failure takes into account both the simple failure and the common mode failure.

* * * * *